United States Patent
Kim et al.

(10) Patent No.: US 10,586,413 B2
(45) Date of Patent: Mar. 10, 2020

(54) ENTRANCE AND EXIT CONTROL SYSTEM AND METHOD FOR BLUETOOTH

(71) Applicant: LINKELECTRONICS CO., LTD., Gyeonggi-do (KR)

(72) Inventors: Youngsoo Kim, Gyeonggi-do (KR); Deokheon Kim, Gyeonggi-do (KR)

(73) Assignee: LINKELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/313,115

(22) PCT Filed: Aug. 22, 2016

(86) PCT No.: PCT/KR2016/009240
§ 371 (c)(1),
(2) Date: Dec. 24, 2018

(87) PCT Pub. No.: WO2017/200148
PCT Pub. Date: Nov. 23, 2017

(65) Prior Publication Data
US 2019/0197807 A1   Jun. 27, 2019

(30) Foreign Application Priority Data
May 18, 2016 (KR) .......................... 10-2016-0060837

(51) Int. Cl.
*G07C 9/00* (2020.01)
*G08C 17/02* (2006.01)
(Continued)

(52) U.S. Cl.
CPC ........... *G07C 9/00309* (2013.01); *G07C 9/00* (2013.01); *G08C 17/02* (2013.01); *H04B 17/327* (2015.01);
(Continued)

(58) Field of Classification Search
CPC ..... H04W 84/18; H04W 84/20; H04W 12/06; H04W 12/08; H04W 76/10
See application file for complete search history.

(56) References Cited

U.S. PATENT DOCUMENTS

| 2006/0194609 A1* | 8/2006 | Matsuo | H04M 1/6066 455/552.1 |
| 2015/0179005 A1* | 6/2015 | Lin | G07C 9/00309 340/5.61 |
| 2015/0371026 A1* | 12/2015 | Gnanasekaran | G06F 21/35 726/7 |

FOREIGN PATENT DOCUMENTS

| KR | 20070066025 | 6/2007 |
| KR | 2020130001749 | 3/2013 |
| KR | 101546610 | 5/2015 |

* cited by examiner

*Primary Examiner* — Benyam Haile
(74) *Attorney, Agent, or Firm* — IPLA P.A.; James E. Bame

(57) ABSTRACT

An entrance and exit control system and method for Bluetooth, wherein a first Bluetooth module mounted on a digital door lock and including an antenna having directivity toward the outside of a door and a second Bluetooth module mounted on a remote controller are configured to communicate with each other, and the first Bluetooth module or the second Bluetooth module is switched from a slave mode to a master mode when a keypad of the digital door lock or a keypad of the remote controller is touched. The digital door lock may switch, in response to a touch, from a slave to a master to implement a door opening function, and the remote controller may switch, in response to a touch, from a slave to a master to implement the door opening function.

2 Claims, 3 Drawing Sheets

(51) Int. Cl.
   *H04Q 9/00* (2006.01)
   *H04B 17/327* (2015.01)
   *H04Q 9/14* (2006.01)
(52) U.S. Cl.
   CPC .................. *H04Q 9/00* (2013.01); *H04Q 9/14* (2013.01); *G07C 2009/00317* (2013.01); *G07C 2009/00404* (2013.01); *G08C 2201/60* (2013.01)

ENTRANCE AND EXIT CONTROL SYSTEM AND METHOD FOR BLUETOOTH

BACKGROUND

The present invention relates to an access control system and method for Bluetooth, and particularly, to an access control system and method for Bluetooth, which implements a door unlocking function as a digital door lock for performing an unlocking function of the digital door lock changes from a slave to a master by touching the digital door lock.

Generally, in the case of a Bluetooth product configured as a pair, Bluetooth communication is possible as one of the two is in a slave mode and the other one is in a master mode.

Of course, in the case of a Bluetooth product configured in plurality, Bluetooth communication is also possible as one of them is in a master mode and the others are in a slave mode.

In relation to this, Patent document 1 provides an apparatus for locking and unlocking a locking device, in which if a wireless signal including a coded password is transmitted from a smart phone or a remote controller dedicated to a door lock, a wireless reception unit receives the signal, and a control unit receives the signal from the wireless reception unit, compares the password included in the signal with a password previously stored in a database, and allows a door lock control unit to lock or unlock the locking device if the passwords match each other, and the door lock control unit is supplied with power from a power supply unit and locks or unlocks the locking device by driving a motor included in a driving unit.

However, presently, a method of unlocking a digital door lock in a manner different from that of comparing passwords as shown in Patent document 1 is needed.

[Patent document 1] Korean Utility Model Registration No. 20-2013-0001749 (Publication date: Mar. 13, 2013)

SUMMARY OF THE INVENTION

Therefore, the present invention has been made in view of the above problems, and it is an object of the present invention to provide an access control system and method for Bluetooth, which implements a door unlocking function as a digital door lock changes from a slave to a master by a touch.

Another object of the present invention is to provide an access control system and method for Bluetooth, which implements a door unlocking function as a remote controller changes from a slave to a master by a touch.

Another object of the present invention is to provide an access control system and method for Bluetooth, which applies a directional antenna so that although the digital door lock is touched from the outside, an approach type door unlocking function may not operate when the remote controller is positioned at a distance of 1 meter or more from the indoor side of the door lock.

To accomplish the above objects, according to one aspect of the present invention, there is provided an access control method for Bluetooth of an access control system for Bluetooth including: a digital door lock mounted on a door and provided with a first Bluetooth module 13 including an antenna having directivity toward the outside of the door; and a remote controller wirelessly connected to the digital door lock, the method including the step of switching the first Bluetooth module from a slave mode to a master mode under the control of a first controller of the digital door lock when an input unit of the digital door lock is touched.

The access control method further includes the steps of: receiving a signal transmitted from the remote controller in a slave mode state and measuring a received signal strength indication (RSSI) value of the received signal, by the first Bluetooth module, under the control of the first controller; connecting the first Bluetooth module and a second Bluetooth module if the measured RSSI value is in an RSSI range in which the digital door lock 10 can be unlocked, by the first controller, so that the digital door lock and the remote controller may perform Bluetooth communication; receiving a unique ID of the remote controller through the Bluetooth communication and comparing the received ID with an ID previously stored in the first Bluetooth module, by the first Bluetooth module, under the control of the first controller; and controlling, by the first controller, to unlock the digital door lock if the unique ID of the remote controller matches the stored ID as a result of the comparison.

The access control method further includes the step of switching the first Bluetooth module from a master mode to a slave mode after the door lock is unlocked.

To accomplish the above object, according to one aspect of the present invention, there is provided an access control method for Bluetooth of an access control system for Bluetooth including: a digital door lock mounted on a door and provided with a first Bluetooth module 13 including an antenna having directivity toward the outside of the door; and a remote controller wirelessly connected to the digital door lock, the method including the step of switching a second Bluetooth module 22 of the remote controller from a slave mode to a master mode when a keypad of the remote controller is touched.

The access control method further includes the steps of: connecting the remote controller in a master mode state and the digital door lock in a slave mode state to perform Bluetooth communication; transmitting a signal for unlocking the digital door lock to the digital door lock through the Bluetooth communication, by the second Bluetooth module, and switching the second Bluetooth module from the master mode to the slave mode; and controlling, by a first controller, to unlock the digital door lock if the first Bluetooth module receives the signal for unlocking the digital door lock.

In an embodiment of the present invention, a door unlocking function can be implemented as a digital door lock changes from a slave to a master by a touch.

In addition, in an embodiment of the present invention, a door unlocking function can be implemented as a remote controller changes from a slave to a master by a touch.

In addition, in an embodiment of the present invention, a directional antenna is applied so that although the digital door lock is touched from the outside, an approach type door unlocking function may not operate when the remote controller is positioned at a distance of 1 meter or more from the indoor side of the door lock.

In addition, in an embodiment of the present invention, there is an effect of measuring and comparing an RSSI value for performing an unlocking function of a digital door lock only by touching the keypad of the digital door lock and comparing a unique ID of a remote controller. That is, there is an effect of unlocking a digital door lock only by touching the keypad of the digital door lock without handling a remote controller.

In addition, in an embodiment of the present invention, there is an effect of switching a digital door lock from a slave mode to a master mode by touching the keypad of the digital door lock and switching the digital door lock from a master mode to a slave mode when the digital door lock is unlocked. That is, there is an effect of not receiving, by the digital door lock in a slave mode state, a signal of a remote controller transmitted in a slave mode. In other words, there is an effect of reducing waste of battery of the digital door lock for receiving the signal of the remote controller.

In addition, in an embodiment of the present invention, there is an effect of switching a remote controller from a slave mode to a master mode by touching the keypad of the remote controller and switching the remote controller from a master mode to a slave mode when the action of touching the keypad of the remote controller is finished. That is, there is an effect of not receiving, by the remote controller in a slave mode state, a signal of the digital door lock transmitted in a slave mode. In other words, there is an effect of reducing waste of battery of the remote controller for receiving the signal of the digital door lock.

DESCRIPTION OF REFERENCE NUMERALS

Figure 1:
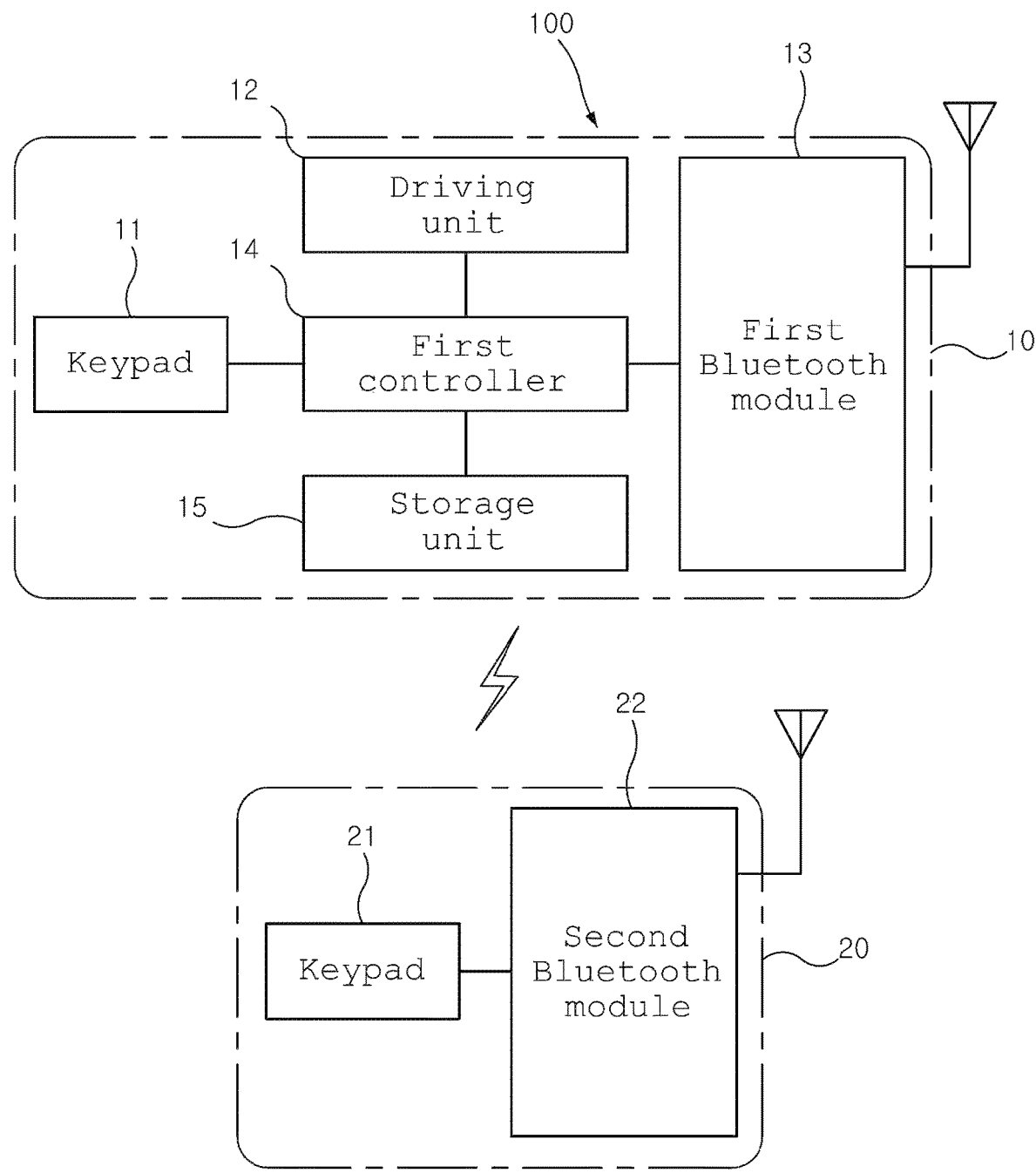
FIG. 1 is a view showing the configuration of an access control system for Bluetooth according to an embodiment of the present invention.

| | |
|---|---|
| 10: Digital door lock | 11: Keypad |
| 12: Driving unit | 13: First Bluetooth module |
| 20: Remote controller | 21: Keypad |
| 22: Second Bluetooth module | |
| 100: Access control system for Bluetooth | |

DETAILED DESCRIPTION OF THE INVENTION

Hereafter, the preferred embodiment of the present invention will be described in detail with reference to the accompanying drawings so that those skilled in the art may easily embody the present invention. However, the present invention may be implemented in a variety of forms and is not limited to the embodiment described herein. In addition, in the drawings, the parts unrelated to the description will be omitted to clearly describe the present invention, and throughout the specification, similar parts will be denoted by similar reference numerals.

Through the specification, when a part is referred to as "including" an element, it means not precluding another element, but further including another element, as far as an opposed description is not specially specified.

FIG. 1 is a view showing the configuration of an access control system for Bluetooth according to an embodiment of the present invention.

As shown in FIG. 1, an access control system 100 for Bluetooth according to an embodiment of the present invention includes a digital door lock 10 installed in and fixed to a door, and a portable remote controller 20 capable of Bluetooth communication with the digital door lock 10.

In addition, the digital door lock 10 includes a keypad 11 that a user touches, a first controller 14 for controlling a first Bluetooth module 13 by touching the keypad 13, and the first Bluetooth module 13 for performing Bluetooth communication with a remote controller 20 under the control of the first controller 14 and having a directional antenna provided toward the outside of the door.

Here, a range of an RSSI value, a unique ID of the remote controller 20, and the number of performing the procedure of confirming the unique ID are previously stored in a storage unit 15 to perform an unlocking function of a driving unit 12 of the digital door lock 10, and the first Bluetooth module 13 is always in a slave mode before the user touches the keypad 11 and transmits, i.e., advertises, a signal indicating the location of the digital door lock 10 through the antenna.

At this point, the antenna has directionality toward the outside of the door, and the digital door lock 10 may set a range of the RSSI value that is the strength of a signal transmitted from the remote controller 20. Here, the range of the RSSI value may be −30 to −80 dBm that can be received within a range of 2 meters from the door toward the outside. These numbers may be diversely changed. Preferably, the range of the RSSI value may be −60 to −80 dBm.

In addition, the remote controller 20 includes a keypad 21 that a user touches, and a second Bluetooth module 22 provided with an antenna and controlled by touching the keypad 21.

Here, a unique ID of the remote controller 20 and a signal for unlocking the digital door lock 10 are previously stored, and the second Bluetooth module 22 is always in a slave mode before the user touches the keypad 21 and transmits, i.e., advertises, a signal indicating the location of the remote controller 20 through the antenna.

Figure 2:
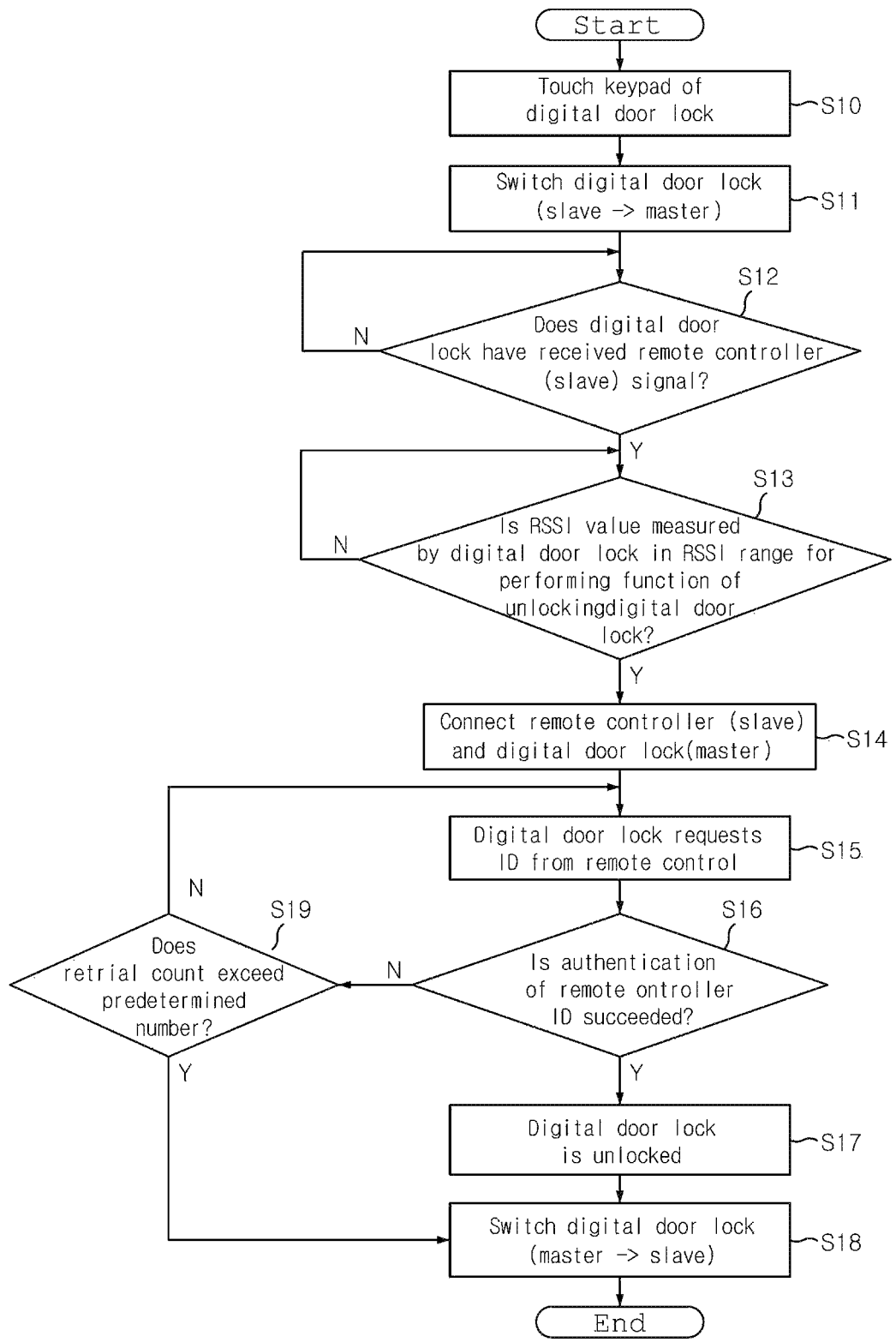
FIG. 2 is a flowchart illustrating an access control system for Bluetooth according to an embodiment of the present invention.

FIG. 2 is a flowchart illustrating an access control system for Bluetooth according to an embodiment of the present invention.

Referring to FIG. 2, the control procedure of the access control system 100 for Bluetooth performed by touching the keypad 11 of the digital door lock 10 is as described below.

First, if a user touches the keypad 11 of the digital door lock 10 (step S10), the first Bluetooth module 13 is switched from a slave mode to a master mode under the control of the first controller 14 mounted on the digital door lock 10 (step S11).

Then, the first Bluetooth module 13 in a master mode state receives a signal transmitted from the second Bluetooth module 22 of the remote controller 20 in a slave mode state under the control of the first controller 14 (step S12), and measures an RSSI value of the received signal (step S13).

Then, if the measured RSSI value is in a range of an RSSI value, in which the digital door lock 10 can be unlocked, previously stored in the first Bluetooth module 13 (step S13), the first controller 14 connects the first Bluetooth module 13 in the master mode state and the second Bluetooth module 22 in the slave mode state so that the digital door lock 10 and the remote controller 20 may be connected to each other to preform Bluetooth communication (step S14).

Then, the first Bluetooth module 13 of the digital door lock 10 receives the unique ID of the remote controller 20 through the Bluetooth communication under the control of the first controller 14 (step S15) and compares the received ID with an ID previously stored in the first Bluetooth module 13 (step S16).

Then, if the unique ID of the remote controller 20 matches the stored ID (step S16), the first controller 14 controls the driving unit 12 to unlock the digital door lock 10 (step S17) and controls the first Bluetooth module 13 to switch from the master mode to the slave mode (step S18).

However, when the number of performing the procedure of confirming the unique ID of the remote controller 20 exceeds a predetermined number (step S19), the first controller 14 controls the first Bluetooth module 13 to switch from the master mode to the slave mode (step S18). That is, the digital door lock 10 is not unlocked.

Meanwhile, the operation of touching the remote controller is as described below.

Figure 3:
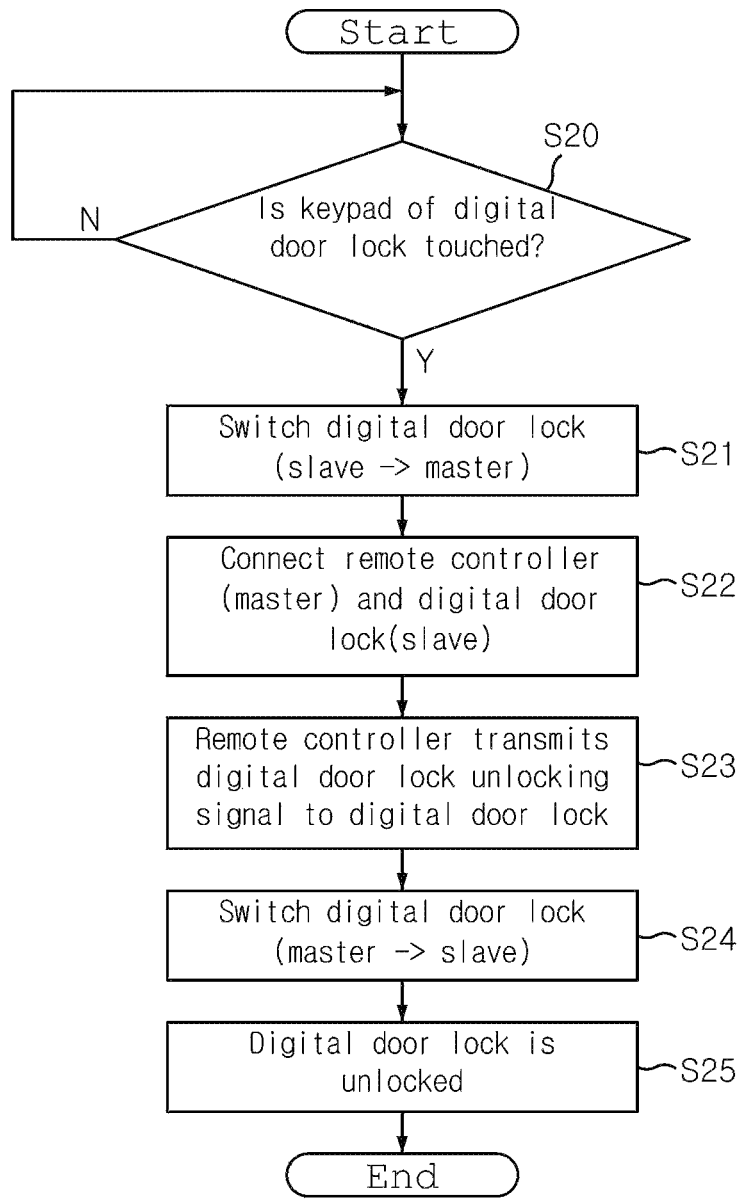
FIG. 3 is another flowchart illustrating an access control system for Bluetooth according to an embodiment of the present invention.

FIG. 3 is another flowchart illustrating an access control system for Bluetooth according to an embodiment of the present invention.

Referring to FIG. 3, the control procedure of the access control system 100 for Bluetooth performed by touching the keypad 21 of the remote controller 20 is as shown below.

First, if a user touches the keypad 21 of the remote controller 20 (step S20), the second Bluetooth module 22 is switched from a slave mode to a master mode (step S21), and the remote controller 20 in a master mode state is connected to the digital door lock 10 in a slave mode state to preform Bluetooth communication (step S22).

Then, the second Bluetooth module 22 transmits a previously stored signal for unlocking the digital door lock 10 to the digital door lock 10 through the Bluetooth communication (step S23) and switches from the master mode to the slave mode (step S24).

Then, if the first Bluetooth module 13 receives the signal for unlocking the digital door lock 10, the first controller 14 controls the driving unit 12 to unlock the digital door lock 10 (step S25).

In an embodiment of the present invention, a door unlocking function can be implemented as a digital door lock changes from a slave to a master by a touch.

In addition, in an embodiment of the present invention, a door unlocking function can be implemented as a remote controller changes from a slave to a master by a touch.

In addition, in an embodiment of the present invention, a directional antenna is applied so that although the digital door lock is touched from the outside, an approach type door unlocking function may not operate when the remote controller is positioned at a distance of 1 meter or more from the indoor side of the door lock.

In addition, in an embodiment of the present invention, there is an effect of measuring and comparing an RSSI value for performing an unlocking function of a digital door lock only by touching the keypad of the digital door lock and comparing a unique ID of a remote controller. That is, there is an effect of unlocking a digital door lock only by touching the keypad of the digital door lock without handling a remote controller.

In addition, in an embodiment of the present invention, there is an effect of switching a digital door lock from a slave mode to a master mode by touching the keypad of the digital door lock and switching the digital door lock from a master mode to a slave mode when the digital door lock is unlocked. That is, there is an effect of not receiving, by the digital door lock in a slave mode state, a signal of a remote controller transmitted in a slave mode. In other words, there is an effect of reducing waste of battery of the digital door lock for receiving the signal of the remote controller.

In addition, in an embodiment of the present invention, there is an effect of switching a remote controller from a slave mode to a master mode by touching the keypad of the remote controller and switching the remote controller from a master mode to a slave mode when the action of touching the keypad of the remote controller is finished. That is, there is an effect of not receiving, by the remote controller in a slave mode state, a signal of the digital door lock transmitted in a slave mode. In other words, there is an effect of reducing waste of battery of the remote controller for receiving the signal of the digital door lock.

The embodiment described above is not implemented only through the apparatus and method, but may be implemented through a program realizing a function corresponding to the configuration of the embodiment of the present invention or a recording medium in which the program is recorded, and those skilled in the art may easily accomplish the implementation from the description of the embodiment described above.

While an embodiment of the present invention has been described in detail, the scope of the present invention is not limited thereto, and various modified and improved forms of the present invention made by those skilled in the art using the basic concept of the present invention defined by the appended claims also fall within the scope of the present invention.

The invention claimed is:

1. An access control method for Bluetooth of an access control system for Bluetooth including:
    a digital door lock mounted on a door and provided with a first Bluetooth module including an antenna having directivity toward the outside of the door; and
    a remote controller wirelessly connected to the digital door lock, the method comprising the step of switching the first Bluetooth module from a slave mode to a master mode under the control of a first controller of the digital door lock when an input unit of the digital door lock is touched;
    receiving a signal transmitted from the remote controller in a slave mode state and measuring a received signal strength indication (RSSI) value of the received signal, by the first Bluetooth module, under the control of the first controller;
    connecting the first Bluetooth module and a second Bluetooth module if the measured RSSI value is in an RSSI range in which the digital door lock 10 can be unlocked, by the first controller, so that the digital door lock and the remote controller may perform Bluetooth communication;
    receiving a unique ID of the remote controller through the Bluetooth communication and comparing the received ID with an ID previously stored in the first Bluetooth module, by the first Bluetooth module, under the control of the first controller;
    controlling, by the first controller, to unlock the digital door lock if the unique ID of the remote controller matches the stored ID as a result of the comparison; and
    switching the first Bluetooth module from a master mode to a slave mode after the door lock is unlocked.

2. An access control method for Bluetooth of an access control system for Bluetooth including:
    a digital door lock mounted on a door and provided with a first Bluetooth module including an antenna having directivity toward the outside of the door; and
    a remote controller wirelessly connected to the digital door lock, the method comprising the step of switching a second Bluetooth module of the remote controller from a slave mode to a master mode only by touching a keypad of the remote controller without operating a predetermined key;
    connecting the remote controller in a master mode state and the digital door lock in a slave mode state to perform Bluetooth communication;
    transmitting a signal for unlocking the digital door lock to the digital door lock through the Bluetooth communication, by the second Bluetooth module, and switching the second Bluetooth module from the master mode to the slave mode; and controlling, by a first controller, to unlock the digital door lock if the first Bluetooth module receives the signal for unlocking the digital door lock.

\* \* \* \* \*